(12) United States Patent
Fukawatase et al.

(10) Patent No.: US 11,077,815 B2
(45) Date of Patent: Aug. 3, 2021

(54) VEHICLE SEAT EQUIPPED WITH SIDE AIRBAG DEVICE, AND SIDE AIRBAG DEVICE

(71) Applicants: TOYOTA JIDOSHA KABUSHIKI KAISHA, Toyota (JP); AUTOLIV DEVELOPMENT AB, Vårgårda (SE)

(72) Inventors: Osamu Fukawatase, Miyoshi (JP); Takamichi Komura, Okazaki (JP); Takeharu Sugishima, Okazaki (JP); Takayuki Shimizu, Toyota (JP); Mitsuo Nogami, Ushiku (JP); Yuto Kobayashi, Tsukuba (JP)

(73) Assignees: TOYOTA JIDOSHA KABUSHIKI KAISHA, Toyota (JP); AUTOLIV DEVELOPMENT AB, Vårgårda (SE)

( * ) Notice: Subject to any disclaimer, the term of this patent is extended or adjusted under 35 U.S.C. 154(b) by 0 days.

(21) Appl. No.: 16/059,374

(22) Filed: Aug. 9, 2018

(65) Prior Publication Data
US 2019/0084516 A1  Mar. 21, 2019

(30) Foreign Application Priority Data
Sep. 20, 2017 (JP) .............................. JP2017-180670

(51) Int. Cl.
*B60R 21/207* (2006.01)
*B60R 21/233* (2006.01)
(Continued)

(52) U.S. Cl.
CPC .......... *B60R 21/207* (2013.01); *B60R 21/233* (2013.01); *B60R 21/2338* (2013.01);
(Continued)

(58) Field of Classification Search
CPC . B60R 21/207; B60R 21/2338; B60R 21/233; B60R 2021/23308;
(Continued)

(56) References Cited

U.S. PATENT DOCUMENTS

2003/0006587 A1  1/2003 Jang et al.
2006/0131847 A1*  6/2006 Sato ...................... B60R 21/207
280/730.2
(Continued)

FOREIGN PATENT DOCUMENTS

CN   102371959 A   3/2012
DE     9405143 U1 * 5/1994 ........... B60R 21/233
(Continued)

*Primary Examiner* — Darlene P Condra
(74) *Attorney, Agent, or Firm* — Oliff PLC

(57) ABSTRACT

A vehicle seat equipped with a side airbag device includes: an inflator disposed on an outer side in a vehicle width direction relative to a side frame; an inner chamber housed inside the side part, and is configured to inflate and deploy toward a part of an occupant on the outer side in the vehicle width direction upon receiving supply of a gas from the inflator; an outer chamber housed inside the side part, and is configured to inflate and deploy toward the outer side in the vehicle width direction and a vehicle front side relative to the inner chamber upon receiving supply of the gas; and a diffuser housed inside the side part and configured to supply the gas into the inner chamber from a first supply port formed in a peripheral wall of the diffuser when the inflator is activated.

19 Claims, 8 Drawing Sheets

(51) Int. Cl.
    *B60R 21/2338*  (2011.01)
    *B60R 21/231*   (2011.01)
(52) U.S. Cl.
    CPC ............ *B60R 2021/23107* (2013.01); *B60R 2021/23308* (2013.01); *B60R 2021/23382* (2013.01)
(58) Field of Classification Search
    CPC .......... B60R 2021/23107; B60R 2021/23382; B60R 21/26
    See application file for complete search history.

(56) References Cited

U.S. PATENT DOCUMENTS

| | | | |
|---|---|---|---|
| 2007/0138773 A1* | 6/2007 | Song | B60R 21/231 280/729 |
| 2009/0020988 A1* | 1/2009 | Sato | B60R 21/23138 280/730.2 |
| 2011/0025034 A1 | 2/2011 | Lim et al. | |
| 2011/0169250 A1 | 7/2011 | Breuninger et al. | |
| 2012/0032425 A1 | 2/2012 | Kwon et al. | |
| 2012/0223550 A1* | 9/2012 | Mazanek | B60R 21/231 297/216.1 |
| 2012/0248745 A1* | 10/2012 | Kwon | B60R 21/207 280/729 |
| 2013/0033022 A1 | 2/2013 | Yamamoto | |
| 2013/0147167 A1 | 6/2013 | Kwon et al. | |
| 2015/0035262 A1 | 2/2015 | Fukushima et al. | |
| 2015/0197212 A1* | 7/2015 | Fujiwara | B60R 21/233 280/729 |
| 2016/0114757 A1* | 4/2016 | Fujiwara | B60R 21/233 280/729 |
| 2016/0159313 A1 | 6/2016 | Fujiwara | |
| 2016/0221528 A1* | 8/2016 | Sugimura | B60R 21/23138 |
| 2017/0158158 A1* | 6/2017 | Thomas | B60R 21/231 |
| 2017/0225640 A1 | 8/2017 | Ohno | |
| 2017/0369020 A1* | 12/2017 | Hiraiwa | B60R 21/23138 |
| 2018/0186326 A1 | 7/2018 | Kobayashi et al. | |
| 2018/0222434 A1* | 8/2018 | Nukaya | B60R 21/23138 |
| 2019/0232914 A1* | 8/2019 | Kobayashi | B60R 21/207 |
| 2019/0283700 A1* | 9/2019 | Kwon | B60R 21/2338 |

FOREIGN PATENT DOCUMENTS

| | | |
|---|---|---|
| DE | 10 2015 220 179 A1 | 4/2016 |
| JP | 2009-23494 A | 2/2009 |
| JP | 2011-031597 A | 2/2011 |
| JP | 2011-527965 A | 11/2011 |
| JP | 2014-80169 A | 5/2014 |
| JP | 2014080169 A * | 5/2014 |
| JP | 2017-140975 A | 8/2017 |
| KR | 10-2013-0063630 A | 6/2013 |
| RU | 2584325 C1 | 5/2016 |
| RU | 2587189 C1 | 6/2016 |
| WO | 2011/132316 A1 | 10/2011 |
| WO | 2017/010169 A1 | 1/2017 |

* cited by examiner

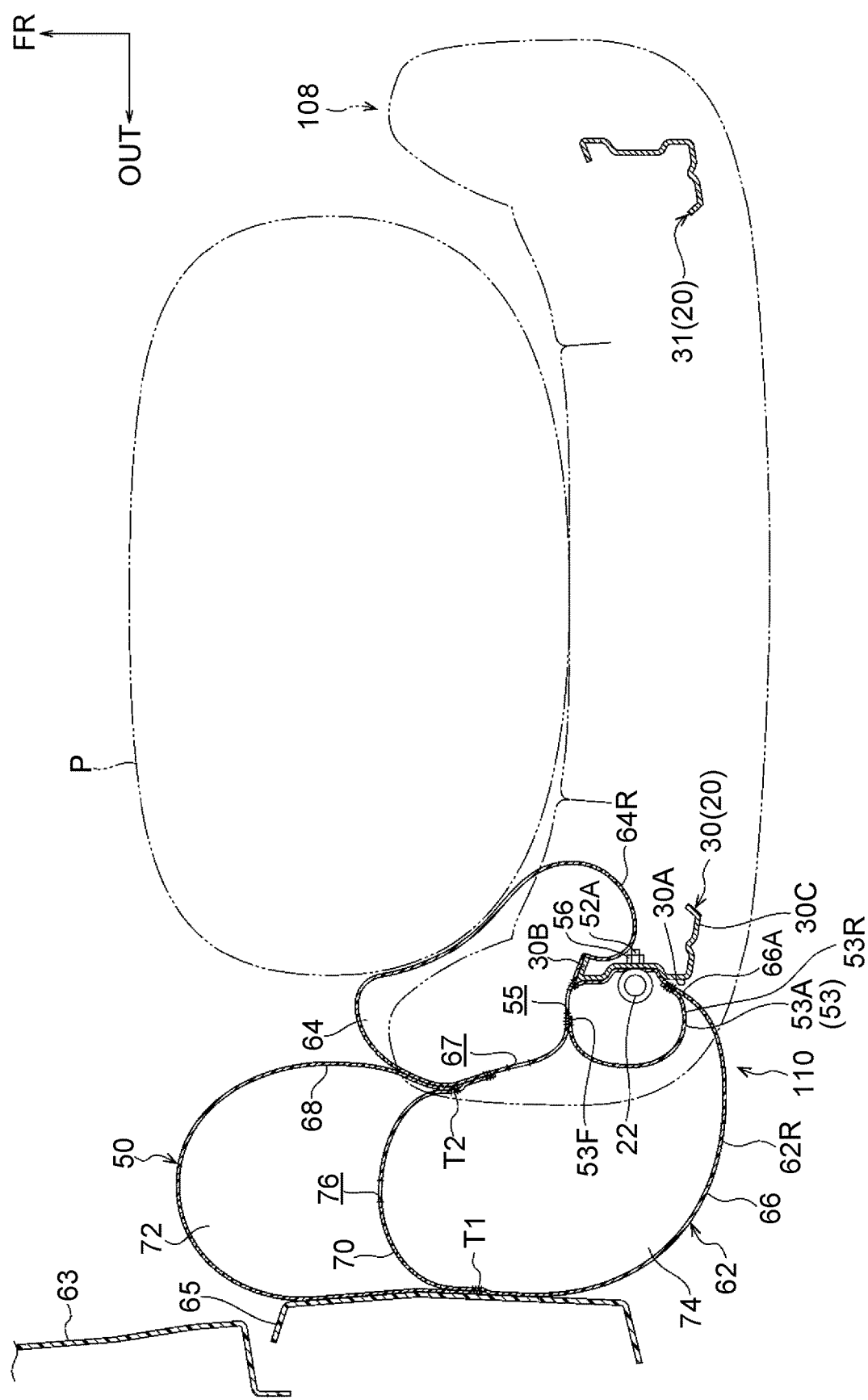

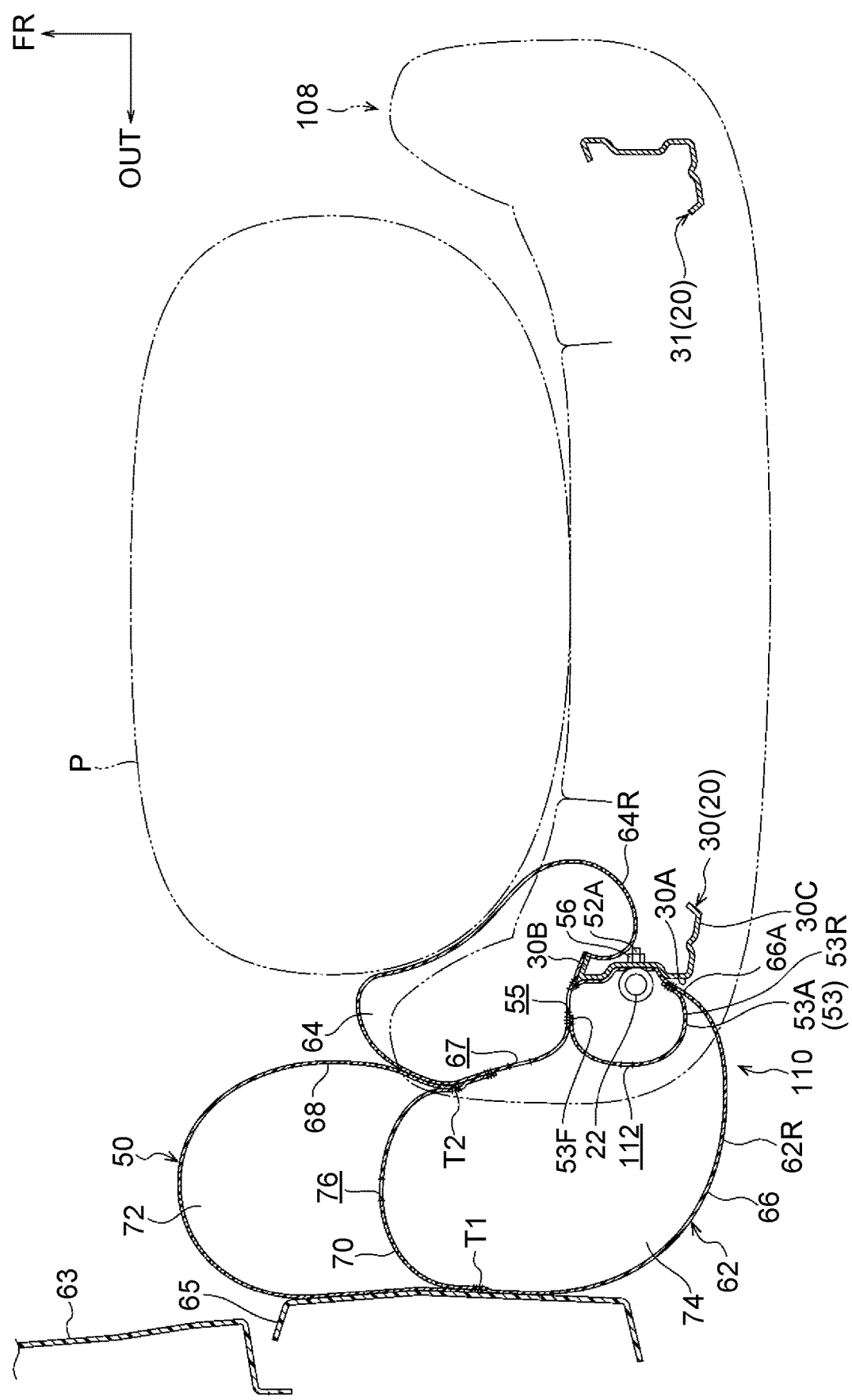

VEHICLE SEAT EQUIPPED WITH SIDE AIRBAG DEVICE, AND SIDE AIRBAG DEVICE

INCORPORATION BY REFERENCE

The disclosure of Japanese Patent Application No. 2017-180670 filed on Sep. 20, 2017 including the specification, drawings and abstract is incorporated herein by reference in its entirety.

BACKGROUND

1. Technical Field

The present disclosure relates to a vehicle seat equipped with a side airbag device, and a side airbag device.

2. Description of Related Art

Japanese Patent Application Publication No. 2009-023494 (JP 2009-023494 A) describes a side airbag device including an inflator, a main airbag, and an auxiliary airbag. In this side airbag device, the inflator that is disposed on an outer side in a seat width direction relative to an outer side frame of a seatback is contained inside a base end portion of the auxiliary airbag. A base end portion of the main airbag is joined to this base end portion of the auxiliary airbag, and the inside of the auxiliary airbag and the inside of the main airbag communicate with each other through a communication hole formed in a joint portion between these base end portions.

In the side airbag device of the above configuration, the auxiliary airbag inflates and deploys inside a side part of the seatback before the main airbag, and moves an occupant toward an inner side in the seat width direction (an inner side in a vehicle width direction) to thereby expand a space between the occupant and a side part of a vehicle body in the vehicle width direction. This makes it easy for the main airbag to inflate and deploy into the space between the occupant and the side part of the vehicle body.

On the other hand, Japanese Patent Application Publication No. 2014-080169 (JP 2014-080169 A) describes a vehicle seat equipped with a side airbag device. In this vehicle seat, an outer side frame provided inside a side part of a seatback on an outer side in a vehicle width direction has a side wall and a rear wall, and an airbag module is installed on an inner side of the side wall in a seat width direction.

The airbag module is composed of a folded side airbag and an inflator that form a module. The side airbag includes a forward deployment airbag that inflates and deploys into a space between an occupant and a side part of a vehicle body, and an internal inflation airbag that inflates inside the seatback. The internal inflation airbag is joined integrally to a rear end of the forward deployment airbag, and the inside of the internal inflation airbag communicates with the inside of the forward deployment airbag. A gas from the inflator contained inside the forward deployment airbag near a joint portion with the internal inflation airbag is distributed into the forward deployment airbag and the internal inflation airbag.

SUMMARY

In the side airbag device described in JP 2009-023494 A, the inflator is disposed on the outer side of the outer side frame in the seat width direction. A portion of the auxiliary airbag on a leading end side from the base end portion turns around from the front side of the outer side frame to the inner side of the outer side frame in the seat width direction and is accordion-folded. As a result, a gas supply path from the base end portion to the leading end-side portion of the auxiliary airbag curves greatly (in a U-shape as seen in a sectional plan view) on the seat front side of the outer side frame. This may cause a delay in inflation and deployment of the auxiliary airbag due to the gas from the inflator being not smoothly supplied to the leading end-side portion of the auxiliary airbag. Thus, there is room for improvement from the viewpoint of restraining the occupant by the auxiliary airbag (inner bag part) earlier.

On the other hand, in the side airbag device described in JP 2014-080169 A, the inflator is disposed on the inner side of the outer side frame in the seat width direction. Since a gas supply path from the inflator to the internal inflation airbag is thus not curved by the outer side frame, the internal inflation airbag can be inflated and deployed early and thereby the occupant can be restrained early. However, since the inflator is provided inside the internal inflation airbag, a high-temperature gas supplied from the inflator is supplied directly into the internal inflation airbag. Thus, there is room for improvement in view of the possibility that the occupant may come in contact with the internal inflation airbag having reached a high temperature.

The present disclosure provides a side airbag device and a vehicle seat equipped with a side airbag device that can achieve both improvement in the performance of initially restraining an occupant and reduction in the possibility of injury to the occupant.

A first aspect of the disclosure provides a vehicle seat equipped with a side airbag device including: an inflator disposed on an outer side in a vehicle width direction relative to a side frame installed inside a side part of a seatback, the side part being located on an outer side in the seatback in the vehicle width direction; an inner chamber housed inside the side part, and is configured to inflate and deploy toward a part of an occupant on the outer side in the vehicle width direction upon receiving supply of a gas from the inflator; an outer chamber housed inside the side part, and is configured to inflate and deploy toward the outer side in the vehicle width direction and a vehicle front side relative to the inner chamber upon receiving supply of the gas; and a diffuser housed inside the side part and contains the inflator, the diffuser being configured to supply the gas into the inner chamber from a first supply port formed in a peripheral wall of the diffuser when the inflator is activated.

In the first aspect, for example, when a side crash of the vehicle occurs, the inflator contained inside the diffuser is triggered and the gas from the inflator is supplied into the inner chamber and the outer chamber. As a result, the inner chamber and the outer chamber inflate and deploy. Here, the first supply port is formed in the peripheral wall of the diffuser, and when the inflator is activated, the gas is supplied from this first supply port into the inner chamber. As the gas from the inflator is thus regulated by the first supply port formed in the diffuser so as to flow into the inner chamber, the gas is supplied into the inner chamber early. Accordingly, inflation and deployment of the inner chamber can be completed early.

The gas from the inflator is supplied into the inner chamber through the first supply port after being once blown out into the diffuser, which can keep the inner chamber from reaching a high temperature.

In the first aspect, the inner chamber and the outer chamber may be configured to inflate and deploy toward the vehicle front side by tearing open a skin of the seatback, such that a space between the occupant and a side part of a vehicle cabin is filled with the inflated and deployed inner chamber and outer chamber.

In this configuration, when inflating and deploying, the inner chamber and the outer chamber inflate and deploy toward the vehicle front side by tearing open the skin of the seatback. Thus, the inner chamber and the outer chamber fill the space between the occupant and the side part of the vehicle cabin. It is therefore possible to achieve earlier initial restraining of the occupant by the inner chamber that completes inflation and deployment early, and to push the occupant toward the inner side of the vehicle cabin by the outer chamber that obtains a reaction force from the side part of the vehicle cabin.

In the first aspect, the first supply port may open toward a part of the occupant on the outer side in the vehicle width direction.

In this configuration, the first supply port of the diffuser opens toward the part of the occupant on the outer side in the vehicle width direction, so that the gas supplied into the inner chamber flows toward the part of the occupant on the outer side in the vehicle width direction. Thus, not only the static pressure of the gas inside the inner chamber, but also the dynamic pressure of the gas flowing from the first supply port toward the part of the occupant on the outer side in the vehicle width direction, can be used to restrain the occupant. Therefore, the occupant can be restrained even in an initial state of inflation and deployment where the amount of gas from the inflator is small.

Further, in the above configuration, the diffuser may be configured to be foldable; and the diffuser and the inner chamber may be configured such that, when the diffuser has received supply of the gas from the inflator, the first supply port is located farther on the vehicle front side than the side frame, and the gas supplied into the inner chamber is supplied into the outer chamber through a second supply port of the inner chamber.

In this configuration, the diffuser is configured to be foldable. When the diffuser has received supply of the gas from the inflator, the first supply port is located farther on the vehicle front side than the side frame, and the gas supplied from the first supply port into the inner chamber is supplied into the outer chamber through the second supply port of the inner chamber. Thus, the gas from the inflator can be supplied into the inner chamber so as to circumvent the side frame, which allows early inflation and deployment of the inner chamber. Moreover, the inner chamber is inflated and deployed earlier than the outer chamber. These factors contribute to earlier initial restraining of the occupant.

Further, in the above configuration, the outer chamber may be divided by a partition into a front chamber located on the vehicle front side and a rear chamber located on a vehicle rear side, the partition having a communication hole; and the inner chamber may communicate with the rear chamber through the second supply port.

In this configuration, the outer chamber is divided into the front chamber and the rear chamber by the partition having the communication hole, and the inner chamber communicates with the rear chamber through the second supply port. Accordingly, the gas from the inflator flows from the first supply port of the diffuser through the inside of the rear chamber, the second supply port, the rear chamber, the communication hole, and the front chamber in this order. Thus, the gas from the inflator is supplied into the inner chamber so as to circumvent the side frame, and then is supplied into the rear chamber and the front chamber.

Therefore, the inner chamber can be inflated and deployed early to provide earlier initial restraint on the occupant. Moreover, the rear chamber inflates and deploys earlier than the front chamber, and then the rear chamber comes in contact with the inner chamber and the side part of the vehicle cabin. The rear chamber thereby obtains a reaction force from the side part of the vehicle cabin early, and this reaction force is transmitted from the rear chamber to the inner chamber, which can further improve the performance of initially restraining the occupant.

Further, in the above configuration, the diffuser may be provided inside the rear chamber.

In this configuration, the diffuser is provided inside the rear chamber, and thus the volume of the rear chamber can be reduced by the volume of the diffuser. Therefore, inflation and deployment of the rear chamber can be completed early.

Further, in the above configuration, the diffuser may have a third supply port that provides communication between an inside of the diffuser and an inside of the rear chamber in the peripheral wall of the diffuser.

In this configuration, the third supply port through which the gas is supplied into the rear chamber is formed in the peripheral wall of the diffuser, which allows early completion of inflation and deployment of the rear chamber.

Further, in the above configuration an opening area of the third supply port may be smaller than an opening area of the first supply port.

In this configuration, the opening area of the third supply port is set to be smaller than the opening area of the first supply port, and thus a large amount of the gas from the inflator inside the diffuser is supplied into the inner chamber. Therefore, the inner chamber is inflated and deployed early, which can improve the performance of initially restraining the occupant.

In the first aspect, when the outer chamber is divided by a partition into a front chamber located on the vehicle front side and a rear chamber located on a vehicle rear side, the partition having a communication hole, and the inner chamber communicates with the rear chamber through the second supply port, the inner chamber and the rear chamber may be configured such that the inner chamber and the rear chamber both in an inflated and deployed state fills a space between the occupant and a side part of a vehicle cabin.

In this configuration, the space between the occupant and the side part of the vehicle cabin is filled with the inner chamber and the rear chamber both in the inflated and deployed state. Here, the inner chamber and the rear chamber inflate and deploy earlier than the front chamber and can obtain a reaction force from the side part of the vehicle cabin early, which can further improve the performance of initially restraining the occupant.

In the first aspect, the outer chamber may be formed by a single chamber.

In this configuration, the outer chamber is formed by a single chamber, and thus the manufacturing cost can be reduced.

In the first aspect, one end of a strap may be mounted on the inner chamber, and the other end of the strap is mounted on the side frame.

In this configuration, one end of the strap is mounted on the inner chamber and the other end of the strap is mounted on the side frame. Thus, a positional shift of the inner chamber upon inflation and deployment of the inner chamber can be suppressed by the strap. Therefore, the inner chamber can be inflated and deployed with high probability toward the part of the occupant on the outer side in the vehicle width direction.

In the first aspect, the diffuser may be configured to be located between a rear part of the outer chamber and a rear part of the inner chamber when the outer chamber and the inner chamber are inflated and deployed.

In this configuration, the diffuser is configured to be located between the rear part of the outer chamber and the rear part of the inner chamber when the diffuser has inflated and deployed, so that the gas flow circumvents the side frame. Thus, the gas can be supplied to the inner chamber and the outer chamber without the gas flow being hindered by the side frame. It is therefore possible to inflate and deploy the inner chamber toward the occupant early, and to eliminate the need for processing the side frame with gas supply taken into account.

In the first aspect, the outer chamber may be configured to restrain a part of an occupant of normal build from a shoulder to a waist as seen from a lateral side of a vehicle when the outer chamber is inflated and deployed, and the inner chamber may be configured to restrain a rear part of the occupant of normal build from the shoulder to a chest as seen from the lateral side of the vehicle when the inner chamber is inflated and deployed.

In this configuration, in the event of a side crash of the vehicle, a wide area of the occupant of normal build from the shoulder to the waist can be restrained by the outer chamber. Moreover, the rear part of the occupant of normal build from the shoulder to the chest that is a part having a relatively high resistance value can be restrained early and effectively by the inner chamber that inflates and deploys early.

Here, the "normal build" is based on AM50 (representing a 50th percentile American adult male).

In the first aspect, the first supply port may be an elongated hole having a longitudinal direction oriented substantially in a seat up-down direction.

In this configuration, the first supply port provided in the diffuser is a long hole having the longitudinal direction oriented substantially in the seat up-down direction, and thus a relatively large opening area of the first supply port can be secured. Accordingly, a larger amount of gas from the inflator inside the diffuser can be supplied into the inner chamber. Therefore, the inner chamber can be inflated and deployed earlier.

In the first aspect, when the outer chamber is divided by a partition into a front chamber located on the vehicle front side and a rear chamber located on a vehicle rear side, the partition having a communication hole, and the inner chamber communicates with the rear chamber through the second supply port, and when the outer chamber is configured to restrain a part of an occupant of normal build from a shoulder to a waist as seen from a lateral side of a vehicle when the outer chamber is inflated and deployed, and the inner chamber is configured to restrain a rear part of the occupant of normal build from the shoulder to a chest as seen from the lateral side of the vehicle when the inner chamber is inflated and deployed, a shoulder restraining portion protruding toward the vehicle front side relative to a portion of the partition in a lower part of the outer chamber may be integrally provided in an upper part of the rear chamber; and the second supply port may include an upper supply port provided on a vehicle upper side in a connection portion between the inner chamber and the rear chamber, and a lower supply port provided on a vehicle lower side relative to the upper supply port and of which an opening area may be set to be smaller than an opening area of the upper supply port.

In this configuration, the shoulder restraining portion protruding toward the vehicle front side relative to the portion of the partition in the lower part of the outer chamber is integrally provided in the upper part of the rear chamber. Thus, the shoulder of the occupant can be restrained more reliably by the shoulder restraining portion that is provided over a wide area in the vehicle front-rear direction and that, like the rear chamber, inflates and deploys earlier than the front chamber. The second supply port includes the upper supply port that is provided on the vehicle upper side in the connection portion between the inner chamber and the rear chamber, and the lower supply port which is disposed on the vehicle lower side relative to the upper supply port and of which the opening area is set to be smaller than the opening area of the upper supply port. Accordingly, a larger amount of gas is supplied into the rear chamber from the upper supply port than from the lower supply port, so that the part of the rear chamber on the vehicle upper side including the shoulder restraining portion inflates and deploys earlier. Therefore, the shoulder of the occupant relatively close to the side part of the vehicle cabin can be restrained more appropriately.

In the first aspect, when the outer chamber is divided by a partition into a front chamber located on the vehicle front side and a rear chamber located on a vehicle rear side, the partition having a communication hole and the inner chamber communicates with the rear chamber through the second supply port, the inner chamber and the rear chamber may be formed by a single chamber.

In this configuration, the inner chamber and the rear chamber are formed by the single chamber, and thus the manufacturing cost can be reduced.

A second aspect of the disclosure provides a side airbag device including: an inflator configured to supply a gas; a diffuser that contains the inflator; an inner chamber of which an inside communicates with an inside of the diffuser through a first supply port formed in a peripheral wall of the diffuser; and an outer chamber of which an inside communicates with the inside of the inner chamber through a second supply port formed in the inner chamber.

In this configuration, in the event of a side crash of the vehicle, the inflator housed inside the diffuser is triggered and the gas from the inflator is supplied into the diffuser. As a result, the diffuser inflates and deploys. Here, the first supply port is formed in the peripheral wall of the diffuser and the second supply port is formed in the inner chamber. Accordingly, when the inflator is activated, the gas is supplied from the first supply port into the inner chamber, and then this gas is supplied from the second supply port into the outer chamber. As the gas from the inflator is thus regulated by the first supply port formed in the diffuser so as to flow into the inner chamber, the gas is supplied into the inner chamber early. Accordingly, inflation and deployment of the inner chamber toward the inner side in the vehicle width direction can be completed early. Thus, the performance of initially restraining the occupant seated on the inner side in the vehicle width direction can be improved.

The gas from the inflator is supplied into the inner chamber through the first supply port after being once blown out into the diffuser, which can keep the inner chamber from reaching a high temperature.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is an enlarged sectional plan view, corresponding to FIG. 2, of a vehicle seat equipped with a side airbag device according to a fifth embodiment, showing a state where an outer chamber and an inner chamber have inflated and deployed; and FIG. 8 is an enlarged sectional plan view, corresponding to FIG. 2, of the vehicle seat equipped with a side airbag device according to a modified example of the fifth embodiment, showing a state where the outer chamber and the inner chamber have inflated and deployed.

DETAILED DESCRIPTION OF EMBODIMENTS

First Embodiment

Figure 1:
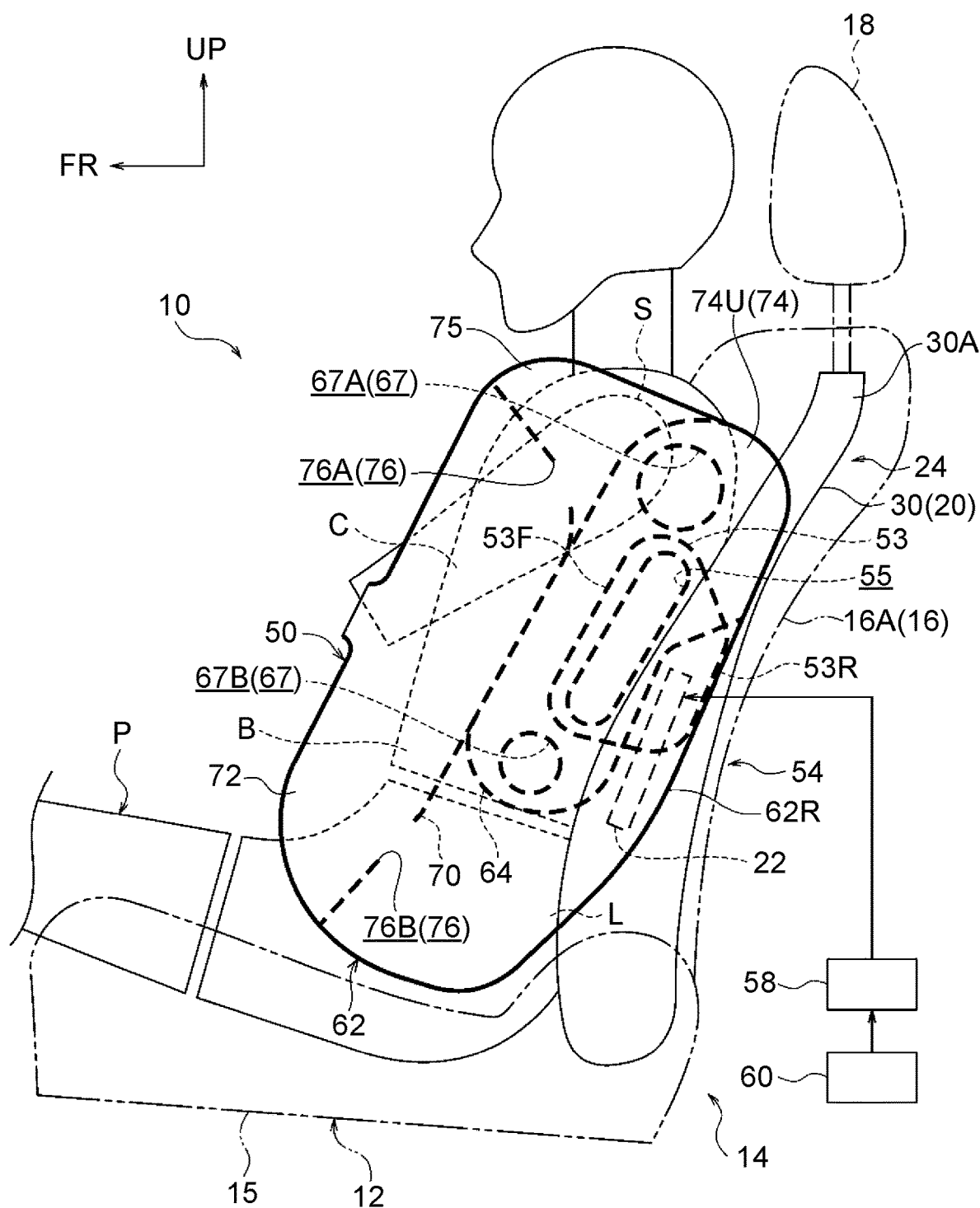
FIG. 1 is a side view of a vehicle seat equipped with a side airbag device according to a first embodiment, showing a state where an outer chamber and an inner chamber have inflated and deployed.

In the following, a vehicle seat 10 equipped with a side airbag device according to an embodiment of the present disclosure (hereinafter abbreviated as the vehicle seat 10) will be described based on FIG. 1 and FIG. 2. The arrows FR, UP, and OUT shown as necessary in the drawings respectively indicate a direction toward a vehicle front side (forward direction), a direction toward a vehicle upper side, and a direction toward an outer side in a vehicle width direction. Unless otherwise specified, directions in the following description referred to simply as front and rear sides, left and right sides, and upper and lower sides respectively indicate front and rear sides in a vehicle front-rear direction, left and right sides in a vehicle left-right direction (vehicle width direction), and upper and lower sides in a vehicle up-down direction.

Configuration

As shown in FIG. 1, the vehicle seat 10 according to this embodiment is composed of a seat main body 12 and a side airbag device 14. Each component will be described below in detail.

Configuration of Seat Main Body 12

The seat main body 12 has a seat cushion 15 on which an occupant P sits, a seatback 16 that is coupled to a rear end of the seat cushion 15 and supports the back of the occupant P, and a headrest 18 that is coupled to an upper end of the seatback 16 and supports the head of the occupant P.

In this embodiment, a front-rear direction, a left-right direction (width direction), and an up-down direction of the seat main body 12 and the seatback 16 coincide respectively with the front-rear direction, the left-right direction (width direction), and the up-down direction of the vehicle. In FIG. 1, FIG. 2, FIG. 5, FIG. 7, and FIG. 8, a crash test dummy P is seated on the seat main body 12 instead of an actual occupant. For example, the dummy P is AM50 (representing a 50th percentile American adult male) of World Side Impact Dummy (WorldSID). To make the description easy to understand, the dummy P will be hereinafter referred to as the occupant P.

Figure 2:
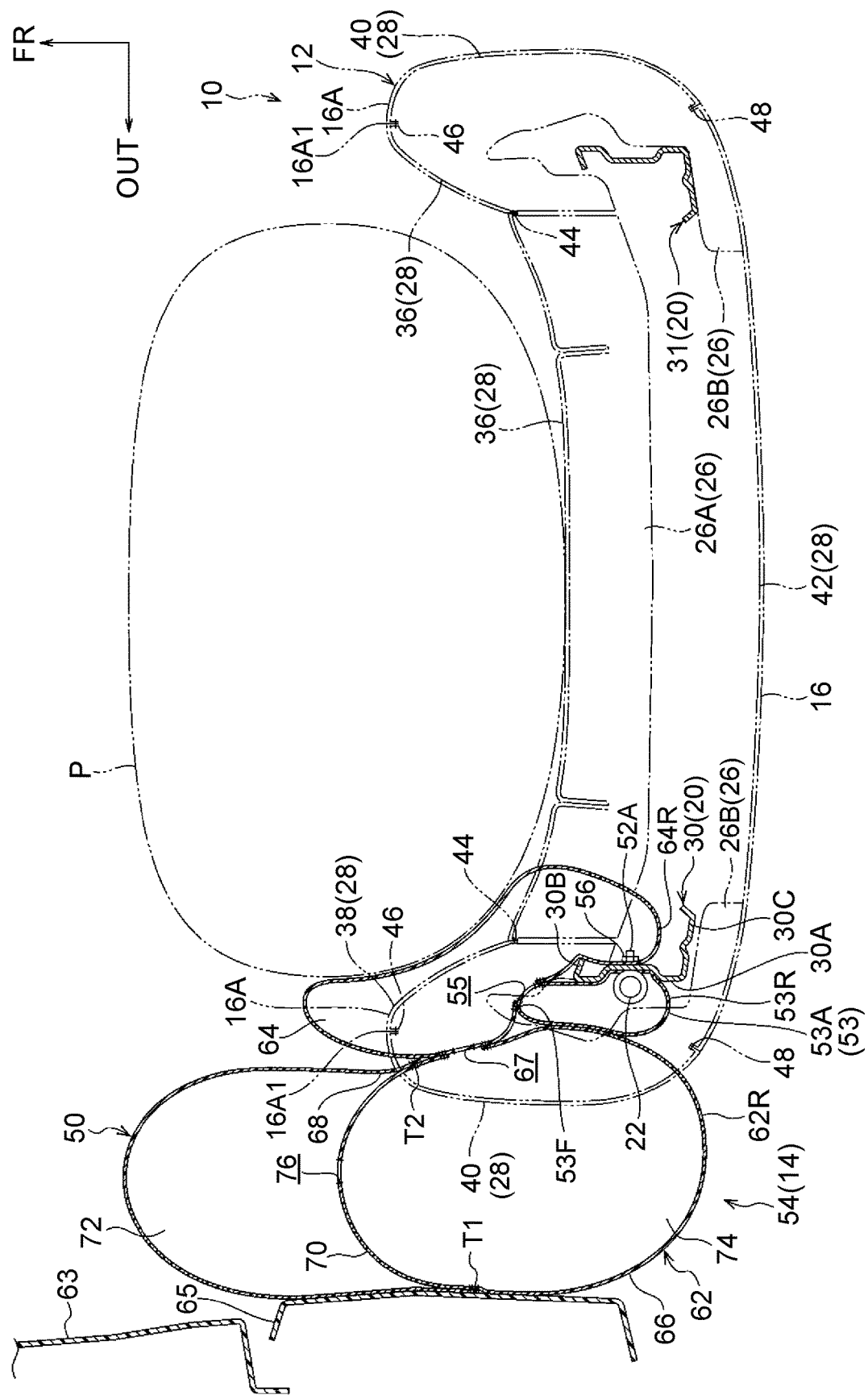
FIG. 2 is an enlarged sectional plan view of the vehicle seat equipped with the side airbag device according to the first embodiment, showing the state where the outer chamber and the inner chamber have inflated and deployed.

As shown in FIG. 1, FIG. 2, etc., the seatback 16 includes a metal seatback frame 20 that is a frame member, and a seatback spring (not shown) mounted on the seatback frame 20. The seatback frame 20 and the seatback spring constitute a frame part 24 of the seatback 16. The seatback 16 includes a seatback pad 26 (see FIG. 2; not shown in the other drawings) put over the frame part 24, and a seat skin 28 (see FIG. 2; not shown in the other drawings) as a skin covering the seatback pad 26.

The seatback frame 20 includes: an outer side frame 30 provided inside a side part 16A that is a side part of the seatback 16 on the outer side in the vehicle width direction; an inner side frame 31 (see FIG. 2) provided inside a side part of the seatback 16 on the inner side in the vehicle width direction; an upper frame (not shown) linking upper ends of the outer side frame 30 and the inner side frame 31 to each other; and a lower frame (not shown) linking lower ends of the outer side frame 30 and the inner side frame 31 to each other in the seat width direction. The outer side frame 30 may be regarded as an example of the "side frame" according to the present disclosure.

As shown in FIG. 2, the outer side frame 30 is composed of a side wall 30A, a front flange 30B, and a rear flange 30C. The side wall 30A extends along the seatback 16 in the front-rear direction as seen from a height direction of the seatback 16. The front flange 30B extends from a front end of the side wall 30A toward the inner side in the seat width direction and the seat rear side. The rear flange 30C extends from a rear end of the side wall 30A toward the inner side in the seat width direction, and is bent at a leading end side obliquely toward the seat front side. Except for being symmetrical with the outer side frame 30 in the left-right direction, the inner side frame 31 has the same configuration as the outer side frame 30.

The seatback pad 26 is formed by a foaming body, such as polyurethane foam, and is composed of a pad center part 26A and a pair of left and right pad side parts 26B. The pad center part 26A is installed on a center side of the seatback 16 in the width direction, and is supported by the seatback spring from the seat rear side. The left and right pad side parts 26B each have a substantially C-shaped cross-section, and respectively contain the outer side frame 30 and the inner side frame 31. The pad side parts 26B are shaped so as to bulge farther toward the seat front side than the pad center part 26A and provide side support for the occupant P.

The seat skin 28 includes a front skin 36 covering the pad center part 26A from the seat front side, front side skins 38 covering the pad side parts 26B from the seat front side, side skins 40 covering the pad side parts 26B from the outer side in the seat width direction and the seat rear side, and a rear skin 42 covering the pad center part 26A from the seat rear side.

The front side skins 38 are each sewn with the front skin 36 at a seam 44 and sewn with the side skin 40 at a seam 46. The side skins 40 are each sewn with the rear skin 42 at a seam 48. The seam 46 between the front side skin 38 and the side skin 40 is located at a front edge 16A1 (so-called side ridge) of the side part 16A. This seam 46 is configured to be torn open along with the pad side part 26B when an outer chamber 62, to be described later, inflates and deploys.

Configuration of Side Airbag Device 14

As shown in FIG. 1 and FIG. 2, the side airbag device 14 includes a side airbag 50, an inflator 22, and a diffuser 53. The side airbag 50 inflates and deploys upon receiving gas supply from the inflator 22 (the state shown in FIG. 1 and FIG. 2). Although this is not shown, the side airbag 50, the diffuser 53, and the inflator 22 are normally housed as an airbag module 54 in a folded state inside the side part 16A. In the following description, a front-rear direction and an up-down direction described in relation to the side airbag 50 indicate these directions in the inflated and deployed state of the side airbag 50, and substantially coincide with the front-rear direction and the up-down direction of the seatback 16.

The inflator 22 is a so-called cylinder inflator and has a columnar shape. The inflator 22 is installed on the outer side of the side wall 30A of the outer side frame 30 in the seat width direction (the outer side thereof in the vehicle width direction), in such a position that an axial direction of the inflator 22 is oriented along the height direction of the seatback 16. A pair of upper and lower stud bolts 52A projects from an outer circumference of the inflator 22 toward the inner side in the seat width direction. The stud bolts 52A extend through the side wall 30A and each have a nut 56 engaged at a leading end side. Thus, the inflator 22 is mounted (fastened and fixed) to the outer side frame 30. Alternatively, a configuration may be adopted in which stud bolts projecting from the outer circumference of the inflator 22 toward the vehicle rear side are engaged with nuts by extending from the vehicle front side through brackets etc. fixed to the outer side frame 30 (this configuration is so-called back-side fastening).

A plurality of gas blow-out openings (not shown) arrayed in a circumferential direction of the inflator 22 is formed in an upper end portion or a lower end portion (here, the upper end portion) of the inflator 22. When the inflator 22 is triggered (activated), a gas is radially blown out from these gas blow-out openings. As shown in FIG. 1, a side crash ECU 58 installed in the vehicle is electrically connected to the inflator 22. A side crash sensor 60 that detects a side crash is electrically connected to the side crash ECU 58. The side crash ECU 58 is configured to trigger the inflator 22 upon detecting (unavoidableness of) a side crash based on a signal from the side crash sensor 60. In a case where a crash prediction sensor (pre-crash sensor) that predicts (foresees) a side crash is electrically connected to the side crash ECU 58, the inflator 22 may be configured to be triggered when the side crash ECU 58 predicts a side crash based on a signal from the crash prediction sensor.

The diffuser 53 is formed by a bag-shaped fabric material, and contains the upper end portion of the inflator 22. The diffuser 53 has through-holes (not shown) formed in a peripheral wall 53A, and the stud bolts 52A extend through these through-holes. By being fastened together with the inflator 22 by the stud bolts 52A, the diffuser 53 is fastened and fixed on the outer side of the side wall 30A of the outer side frame 30. In a state where the diffuser 53 has inflated and deployed upon receiving gas supply from the inflator 22, a front part 53F of the diffuser 53 is located farther on the seat front side than the front flange 30B of the outer side frame 30.

A first supply port 55 is formed in the peripheral wall 53A of the diffuser 53. The first supply port 55 is a long hole having a longitudinal direction oriented substantially in the up-down direction, and an inside of the diffuser 53 communicates with an inside of an inner chamber 64, to be described later, through the first supply port 55. The first supply port 55 opens toward a part of the occupant P on the outer side in the vehicle width direction (i.e., in a direction inclined to the direction toward the vehicle front side from the direction to the inner side in the vehicle width direction), and when the diffuser 53 has inflated and deployed, the first supply port 55 is located farther on the seat front side than the front flange 30B of the outer side frame 30.

The side airbag 50 is composed of the outer chamber 62 and the inner chamber 64. The inner chamber 64 inflates inside the side part 16A as the gas from the inflator 22 inside the diffuser 53 is supplied to the inner chamber 64 through the first supply port 55 formed in the peripheral wall 53A of the diffuser 53. The outer chamber 62 inflates and deploys toward the seat front side of the side part 16A upon receiving gas supply from second supply ports 67 formed in a connection portion between the outer chamber 62 and the inner chamber 64, and the inflated and deployed outer chamber 62 is located in a space between the occupant P and a side part of a vehicle body (here, at least one of a door trim 63 of a side door and a B-pillar garnish 65 shown in FIG. 2).

The outer chamber 62 is formed by a bag-shaped fabric material, and when seen in an inflated and deployed state from a lateral side as shown in FIG. 1, has a substantially rectangular shape elongated along the height direction of the seatback 16. The outer chamber 62 is formed so as to be large enough to restrain the shoulder S, the chest C, the abdomen B, and the waist L of the occupant P.

The outer chamber 62 is divided into a front chamber 72 and a rear chamber 74 by a tether 70 (partition fabric) as a partition provided inside the outer chamber 62. The tether 70 is formed by the same fabric material as the outer chamber 62 and has an elongated band shape. One long-side edge of the tether 70 is sewn at a seam T1 (see FIG. 2) to a base fabric 66 forming a part of the outer chamber 62 on the outer side in the vehicle width direction, while the other long-side edge is sewn at a seam T2 (see FIG. 2) to a base fabric 68 forming a part of the outer chamber 62 on the inner side in the vehicle width direction.

The tether 70 is set so as to have an inverted L-shape in the inflated and deployed state of the outer chamber 62 as seen from a lateral side of the vehicle. Specifically, a lower end portion of the tether 70 is inclined so as to extend toward the rear side as the tether 70 extends from a lower end of the outer chamber 62 toward the upper side, and an intermediate portion of the tether 70 in the up-down direction extends in the height direction of the seatback 16 so as to extend substantially along the front edge (so-called side ridge) of the side part 16A of the seatback 16. An upper end portion of the tether 70 is inclined so as to extend toward the rear side as the tether 70 extends from a front end of the outer chamber 62 toward the lower side. Owing to this shape of the tether 70, a shoulder restraining portion 75 protruding toward the front side is integrally provided in an upper part 74U of the rear chamber 74.

The tether 70 has inner vent holes 76 as communication holes. The inner vent holes 76 include an upper inner vent hole 76A and a lower inner vent hole 76B. Specifically, the upper inner vent hole 76A is formed in the inclined upper end portion of the tether 70 and the lower inner vent hole 76B is formed in the lower end portion of the tether 70 extending in the up-down direction. An inside of the front chamber 72 and an inside of the rear chamber 74 communicate with each other through the upper inner vent hole 76A and the lower inner vent hole 76B. As the gas inside the inner chamber 64 is supplied into the rear chamber 74 of the above configuration through the second supply ports 67 to be described later, the rear chamber 74 inflates and deploys toward the outer side in the seat width direction and the seat front side relative to the inner chamber 64 by tearing open the seam 46 of the seat skin 28 in the side part 16A. Then, the front chamber 72 of the above configuration inflates and deploys toward the seat front side as the gas inside the rear chamber 74 is supplied into the front chamber 72 through the upper inner vent hole 76A and the lower inner vent hole 76B.

In this inflated and deployed state of the outer chamber 62, the front chamber 72 of the outer chamber 62 restrains a front part side of the occupant P from the shoulder S to the waist L, while the rear chamber 74 restrains a rear part side of the occupant P from the shoulder S to the waist L.

The inner chamber 64 is formed in a bag shape by the same fabric material as the outer chamber 62. The dimensions of the inner chamber 64 in the up-down direction and the front-rear direction are set to be sufficiently small compared with those of the outer chamber 62, and the inner chamber 64 is formed so as to have a sufficiently smaller volume than the outer chamber 62.

As shown in FIG. 2, the inner chamber 64 protrudes from the front part 53F of the diffuser 53 toward the inner side of the outer side frame 30 in the seat width direction by passing through the seat front side of the front flange 30B. Through-holes (not shown) are formed in a portion of a rear part 64R of the inner chamber 64 corresponding to a portion of the side wall 30A on the inner side in the seat width direction. The stud bolts 52A extend through these through-holes, and the inner chamber 64 is fastened and fixed on the inner side of the side wall 30A of the outer side frame 30 by being fastened together when the inflator 22 is fastened.

The second supply ports 67 are formed in a portion of the inner chamber 64 at which the inner chamber 64 is connected to the rear chamber 74 of the outer chamber 62. The inside of the inner chamber 64 communicates with the inside of the rear chamber 74 through the second supply ports 67. The second supply ports 67 include an upper supply port 67A that is provided on the upper side in the connection portion between the inner chamber 64 and the rear chamber 74, and a lower supply port 67B that is provided on the vehicle lower side relative to the upper supply port 67A (see FIG. 1). The opening area of the lower supply port 67B is set to be smaller than the opening area of the upper supply port 67A.

The inner chamber 64 is installed so as to face the rear part side of the occupant P from the shoulder S to the chest C from the outer side in the seat width direction as seen in the side view of the seat shown in FIG. 1. Thus, the inner chamber 64 deploys in the vicinity of a surface of the side part 16A on the inner side in the vehicle width direction as seen in the side view of the seat. As shown in FIG. 2, as the gas from the inflator 22 inside the diffuser 53 is supplied into the inner chamber 64 of the above configuration through the first supply port 55, the inner chamber 64 inflates by tearing open the seam 46 of the seat skin 28 in the side part 16A. The inflated inner chamber 64 inflates and deploys toward the inner side in the seat width direction (toward the part of the occupant P on the outer side in the vehicle width direction) by receiving a reaction force from the front flange 30B of the outer side frame 30. Thus, the rear part side of the occupant P from the shoulder S to the chest C is restrained by the inner chamber 64. The diffuser 53 is configured so as to be located between a rear part 62R of the outer chamber 62 and the rear part 64R of the inner chamber 64 when the diffuser 53 has inflated and deployed. The inner chamber 64 can be any chamber that can restrain at least the rear part side of the chest C (a rear part side of ribs).

Next, how the gas flows inside the side airbag 50 when the inflator 22 is triggered will be described using FIG. 2. To make the description easy to understand, FIG. 2 shows the state where the diffuser 53, the inner chamber 64, and the outer chamber 62 have inflated and deployed.

In the side airbag device 14 of the above configuration, the upper end portion of the inflator 22 is contained inside the diffuser 53. Therefore, when the inflator 22 is triggered, the gas is first supplied into the diffuser 53. As a result, the diffuser 53 inflates.

Next, part of the gas supplied into the diffuser 53 is supplied into the inner chamber 64 through the first supply port 55. As a result, the inner chamber 64 inflates.

Next, part of the gas supplied into the inner chamber 64 is supplied into the rear chamber 74 of the outer chamber 62 through the second supply ports 67. As a result, the rear chamber 74 inflates.

Next, part of the gas supplied into the rear chamber 74 is supplied into the front chamber 72 through the upper inner vent hole 76A and the lower inner vent hole 76B. As a result, the front chamber 72 inflates. As a result of the gas flowing as described above, the inner chamber 64 has the highest internal pressure, the rear chamber 74 has the second highest internal pressure, and the front chamber 72 has the lowest internal pressure.

Workings and Effects of First Embodiment

Next, the workings and effects of this embodiment will be described.

In this embodiment, for example, when a side crash of the vehicle occurs, the inflator 22 contained inside the diffuser 53 is triggered and the gas from the inflator 22 is supplied into the inner chamber 64 and the outer chamber 62. As a result, the inner chamber 64 and the outer chamber 62 inflate and deploy. Here, the first supply port 55 is formed in the peripheral wall 53A of the diffuser 53, and when the inflator 22 is activated, the gas is supplied from the first supply port 55 into the inner chamber 64. As the gas from the inflator 22 is thus regulated by the first supply port 55 formed in the diffuser 53 so as to flow into the inner chamber 64, the gas is supplied into the inner chamber 64 early. Therefore, inflation and deployment of the inner chamber 64 can be completed early.

The gas from the inflator 22 is supplied into the inner chamber 64 through the first supply port 55 after being once blown out into the diffuser 53 disposed on the outer side of the outer side frame 30 in the vehicle width direction, which can keep the inner chamber 64 from reaching a high temperature. Thus, the side airbag device 14 and the vehicle seat 10 equipped with the side airbag device 14 according to the present disclosure can achieve both improvement in the performance of initially restraining the occupant P and reduction in the possibility of injury to the occupant P.

When inflating and deploying, the inner chamber 64 and the outer chamber 62 inflate and deploy toward the vehicle front side by tearing open the seam 46 of the seat skin 28 of the seatback 16. Thus, the inner chamber 64 and the outer chamber 62 fill the space between the occupant P and at least one of the door trim 63 and the B-pillar garnish 65 as the side part of the vehicle cabin. It is therefore possible to achieve earlier initial restraining of the occupant P by the inner chamber 64 that completes inflation and deployment early, and to push the occupant P toward the inner side of the vehicle cabin by the outer chamber 62 that obtains a reaction force from at least one of the door trim 63 and the B-pillar garnish 65. FIG. 2 shows a configuration in which the space between the occupant P and the door trim 63 is not filled with the inner chamber 64 and the outer chamber 62, but another configuration may be adopted in which the space between the occupant P and the door trim 63 is filled with the inner chamber 64 and the outer chamber 62 as the vehicle seat 10 is slid forward and rearward or reclined.

Since the first supply port 55 of the diffuser 53 opens toward the part of the occupant P on the outer side in the vehicle width direction, the gas supplied into the inner chamber 64 flows toward the part of the occupant P on the outer side in the vehicle width direction. Thus, not only the static pressure of the gas inside the inner chamber 64, but also the dynamic pressure of the gas flowing from the first supply port 55 toward the part of the occupant P on the outer side in the vehicle width direction, can be used to restrain the occupant P. Therefore, the occupant P can be restrained even in an initial state of inflation and deployment where the amount of gas from the inflator 22 is small.

When the diffuser 53 has received gas supply from the inflator 22, the first supply port 55 is located farther on the vehicle front side than the outer side frame 30, and the gas supplied from the first supply port 55 into the inner chamber 64 is supplied into the outer chamber 62 through the second supply ports 67 of the inner chamber 64. Thus, the gas from the inflator 22 can be supplied into the inner chamber 64 so as to circumvent the outer side frame 30, which allows early inflation and deployment of the inner chamber 64. Moreover, the inner chamber 64 is inflated and deployed earlier than the outer chamber 62. These factors contribute to earlier initial restraining of the occupant P.

The outer chamber 62 is divided into the front chamber 72 and the rear chamber 74 by the tether 70 having the inner vent holes 76, and the inner chamber 64 communicates with the rear chamber 74 through the second supply ports 67. Accordingly, the gas from the inflator 22 flows from the first supply port 55 of the diffuser 53 through the inside of the inner chamber 64, the second supply ports 67, the rear chamber 74, the inner vent holes 76, and the front chamber 72 in this order. Thus, the gas from the inflator 22 is supplied into the inner chamber 64 so as to circumvent the outer side frame 30, and then is supplied into the rear chamber 74 and the front chamber 72. Therefore, the inner chamber 64 can be inflated and deployed early to provide earlier initial restraint on the occupant P. The rear chamber 74 inflates and deploys earlier than the front chamber 72, and then the rear chamber 74 comes in contact with the inner chamber 64 and at least one of the door trim 63 and the B-pillar garnish 65. The rear chamber 74 thereby obtains a reaction force from at least one of the door trim 63 and the B-pillar garnish 65 early, and this reaction force is transmitted from the rear chamber 74 to the inner chamber 64, which can further improve the performance of initially restraining the occupant P.

The space between the occupant P and at least one of the door trim 63 and the B-pillar garnish 65 is filled with the inner chamber 64 and the rear chamber 74 both in the inflated and deployed state. Here, the inner chamber 64 and the rear chamber 74 inflate and deploy earlier than the front chamber 72 and can obtain a reaction force from at least one of the door trim 63 and the B-pillar garnish 65 early, which can further improve the performance of initially restraining the occupant P.

The diffuser 53 is configured to be located between the rear part 62R of the outer chamber 62 and the rear part 64R of the inner chamber 64 when the diffuser 53 has inflated and deployed, so that the gas flow circumvents the outer side frame 30. Thus, the gas can be supplied to the inner chamber 64 and the outer chamber 62 without the gas flow being hindered by the outer side frame 30. It is therefore possible to inflate and deploy the inner chamber 64 toward the occupant P early, and to eliminate the need for processing the outer side frame 30 with gas supply taken into account.

In the event of a side crash of the vehicle, a large area of the occupant P from the shoulder S to the waist L can be restrained by the outer chamber 62. Moreover, the rear part of the occupant P from the shoulder S to the chest C that is a part having a relatively high resistance value can be restrained early and effectively by the inner chamber 64 that inflates and deploys early.

The first supply port 55 provided in the diffuser 53 is formed as a long hole having the longitudinal direction oriented substantially in the seat up-down direction, and thus a relatively large opening area of the first supply port can be secured. Accordingly, a larger amount of gas from the inflator 22 inside the diffuser 53 can be supplied into the inner chamber 64. Therefore, the inner chamber 64 can be inflated and deployed earlier.

As shown in FIG. 1, the shoulder restraining portion 75 protruding toward the vehicle front side relative to a portion of the tether 70 in a lower part of the outer chamber 62 is integrally provided in the upper part 74U of the rear chamber 74. Thus, the shoulder S of the occupant P can be restrained more reliably by the shoulder restraining portion 75 that is provided over a large area in the vehicle front-rear direction and that, like the rear chamber 74, inflates and deploys earlier than the front chamber 72. The second supply ports 67 include the upper supply port 67A that is provided on the vehicle upper side in the connection portion between the inner chamber 64 and the rear chamber 74, and the lower supply port 67B which is provided on the vehicle lower side relative to the upper supply port 67A and of which the opening area is set to be smaller than the opening area of the upper supply port 67A. Accordingly, a larger amount of gas is supplied into the rear chamber 74 from the upper supply port 67A than from the lower supply port 67B, so that the part of the rear chamber 74 on the vehicle upper side including the shoulder restraining portion 75 inflates and deploys earlier. Therefore, the shoulder S of the occupant P relatively close to the side part of the vehicle cabin can be restrained more appropriately.

Second Embodiment

Next, a vehicle seat 80 equipped with a side airbag device according to a second embodiment of the present disclosure will be described using FIG. 3. Those components that are the same as in the first embodiment will be denoted by the same reference sings and the description thereof will be omitted.

Figure 3:
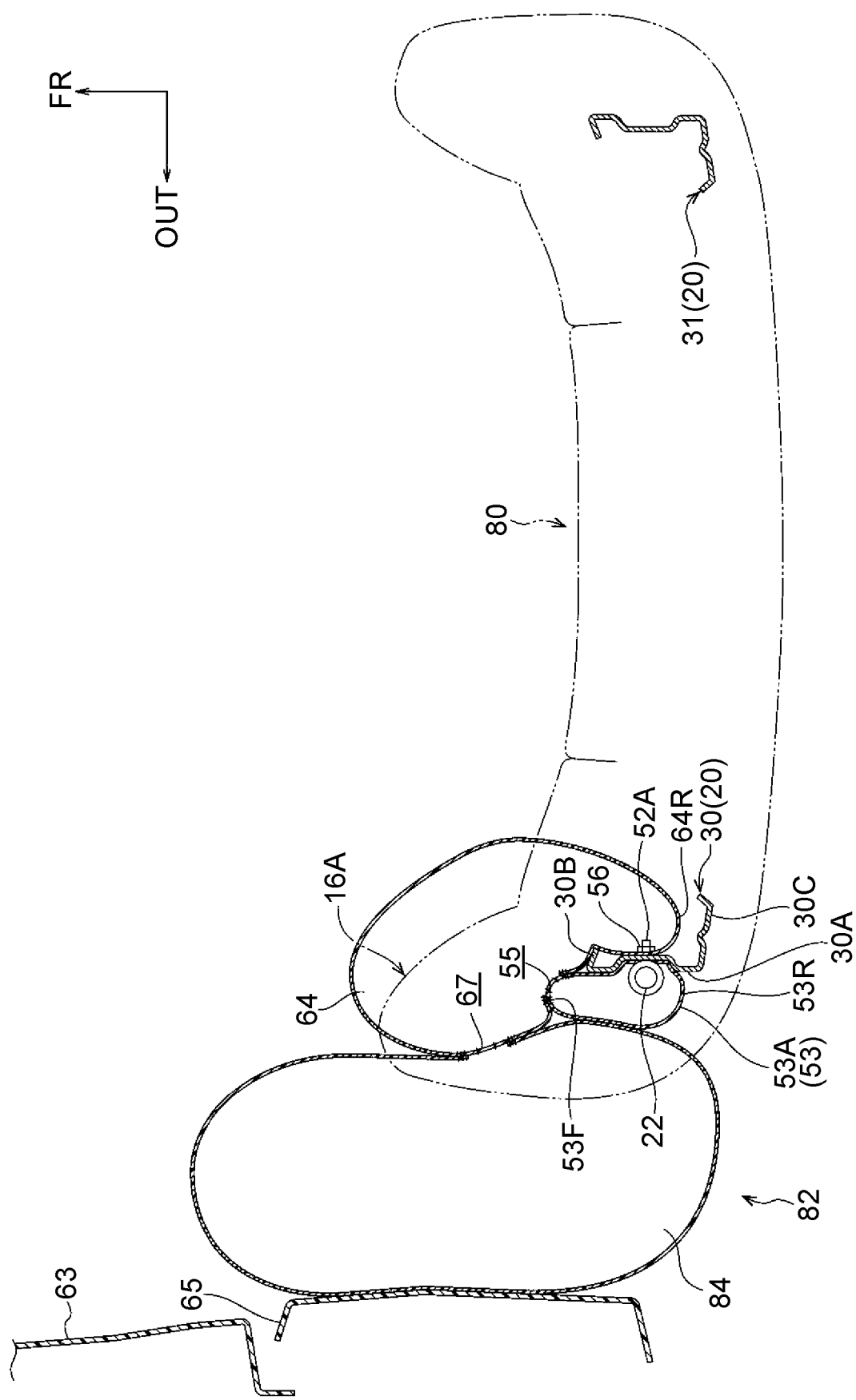
FIG. 3 is an enlarged sectional plan view, corresponding to FIG. 2, of a vehicle seat equipped with a side airbag device according to a second embodiment, showing a state where an outer chamber and an inner chamber have inflated and deployed.

As shown in FIG. 3, the vehicle seat 80 equipped with a side airbag device 82 according to the second embodiment has the same basic configuration as the first embodiment, and is characterized in that an outer chamber 84 is a single chamber.

Specifically, the outer chamber 84 has a bag shape, and when seen in the inflated and deployed state from the lateral side as shown in FIG. 1, has a substantially rectangular shape elongated along the height direction of the seatback 16. The outer chamber 84 is a single chamber formed so as to be large enough to restrain the shoulder S, the chest C, the abdomen B, and the waist L of the occupant P.

Workings and Effects of Second Embodiment

Next, the workings and effects of this embodiment will be described.

The above configuration can produce effects similar to those of the first embodiment, since the vehicle seat 80 has the same configuration as the vehicle seat 10 equipped with the side airbag device of the first embodiment, except that the outer chamber 84 is a single chamber as described above. Moreover, with the outer chamber 84 being a single chamber, this configuration can reduce the manufacturing cost.

Third Embodiment

Next, a vehicle seat 86 equipped with a side airbag device according to a third embodiment of the present disclosure will be described using FIG. 4. Those components that are the same as in the first embodiment will be denoted by the same reference signs and the description thereof will be omitted.

Figure 4:
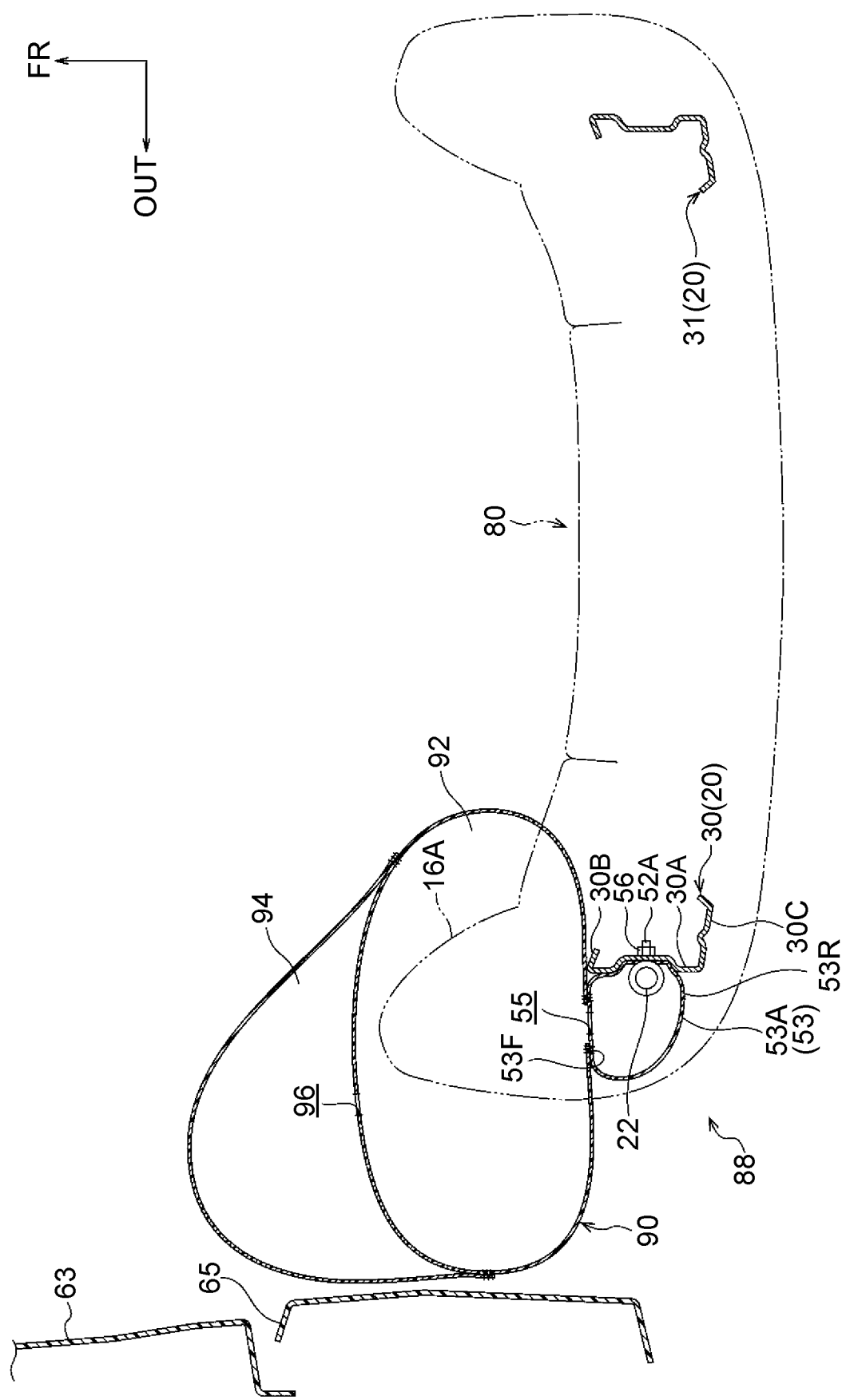
FIG. 4 is an enlarged sectional plan view, corresponding to FIG. 2, of a vehicle seat equipped with a side airbag device according to a third embodiment, showing a state where an outer chamber and an inner chamber have inflated and deployed.

As shown in FIG. 4, the vehicle seat 86 equipped with a side airbag device 88 according to the third embodiment has the same basic configuration as the first embodiment, and is characterized in that chambers corresponding to the inner chamber 64 and the rear chamber 74 of the first embodiment are formed by a single chamber.

Specifically, a side airbag 90 is composed of an inner chamber 92 and a front chamber 94. As the gas from the inflator 22 inside the diffuser 53 is supplied into the inner chamber 92 through the first supply port 55 formed in the peripheral wall 53A of the diffuser 53, the inner chamber 92 inflates and deploys toward the seat outer side by tearing open the seam 46 of the seat skin 28 in the side part 16A, and is located in the space between the occupant P (see FIG. 2) and at least one of the door trim 63 and the B-pillar garnish 65. Thus, the inner chamber 92 is a chamber corresponding to the inner chamber 64 and the rear chamber 74 of the first embodiment.

The front chamber 94 inflates and deploys toward the seat front side of the side part 16A upon receiving gas supply from an inner vent hole 96 formed at a boundary with the inner chamber 92, so as to be located in the space between the occupant P on one side and the door trim 63 of the side door and the B-pillar garnish 65 on the other side.

Workings and Effects of Third Embodiment

Next, the workings and effects of this embodiment will be described.

This configuration can produce effects similar to those of the first embodiment, since the vehicle seat 86 has the same configuration as the vehicle seat 10 equipped with the side airbag device of the first embodiment, except that the chambers corresponding to the inner chamber 64 and the rear chamber 74 of the first embodiment are formed by the single inner chamber 92 as described above. Moreover, with the chambers corresponding to the inner chamber 64 and the rear chamber 74 of the first embodiment being formed by the single inner chamber 92, this configuration can reduce the manufacturing cost.

Fourth Embodiment

Next, a vehicle seat 98 equipped with a side airbag device according to a fourth embodiment of the present disclosure will be described using FIG. 5 and FIG. 6. Those components that are the same as in the first embodiment will be denoted by the same reference signs and the description thereof will be omitted.

Figure 5:
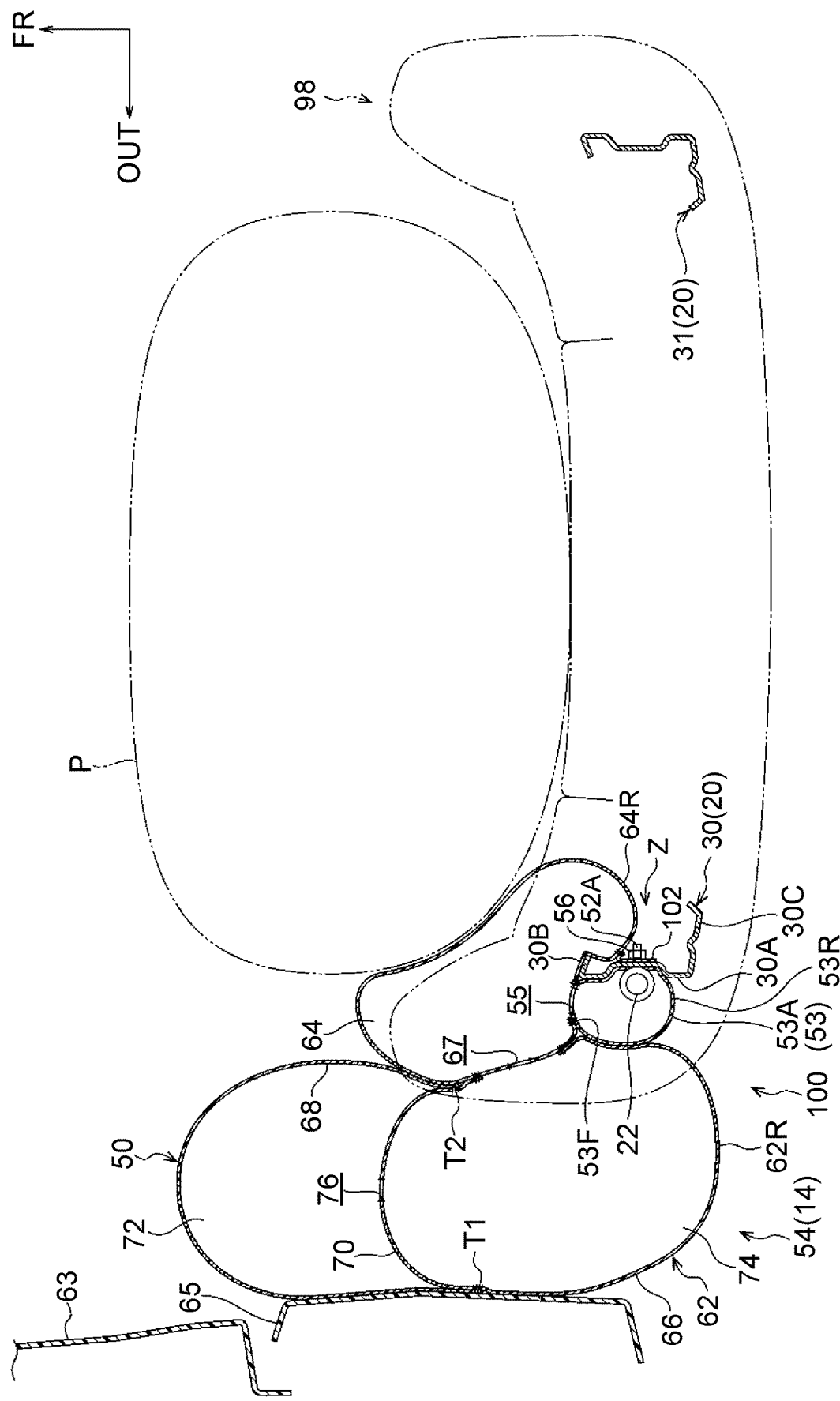
FIG. 5 is an enlarged sectional plan view, corresponding to FIG. 2, of a vehicle seat equipped with a side airbag device according to a fourth embodiment, showing a state where an outer chamber and an inner chamber have inflated and deployed.

As shown in FIG. 5, the vehicle seat 98 equipped with a side airbag device 100 according to the fourth embodiment has the same basic configuration as the first embodiment, and is characterized in that a strap 102 is mounted on the inner chamber 64.

Figure 6:
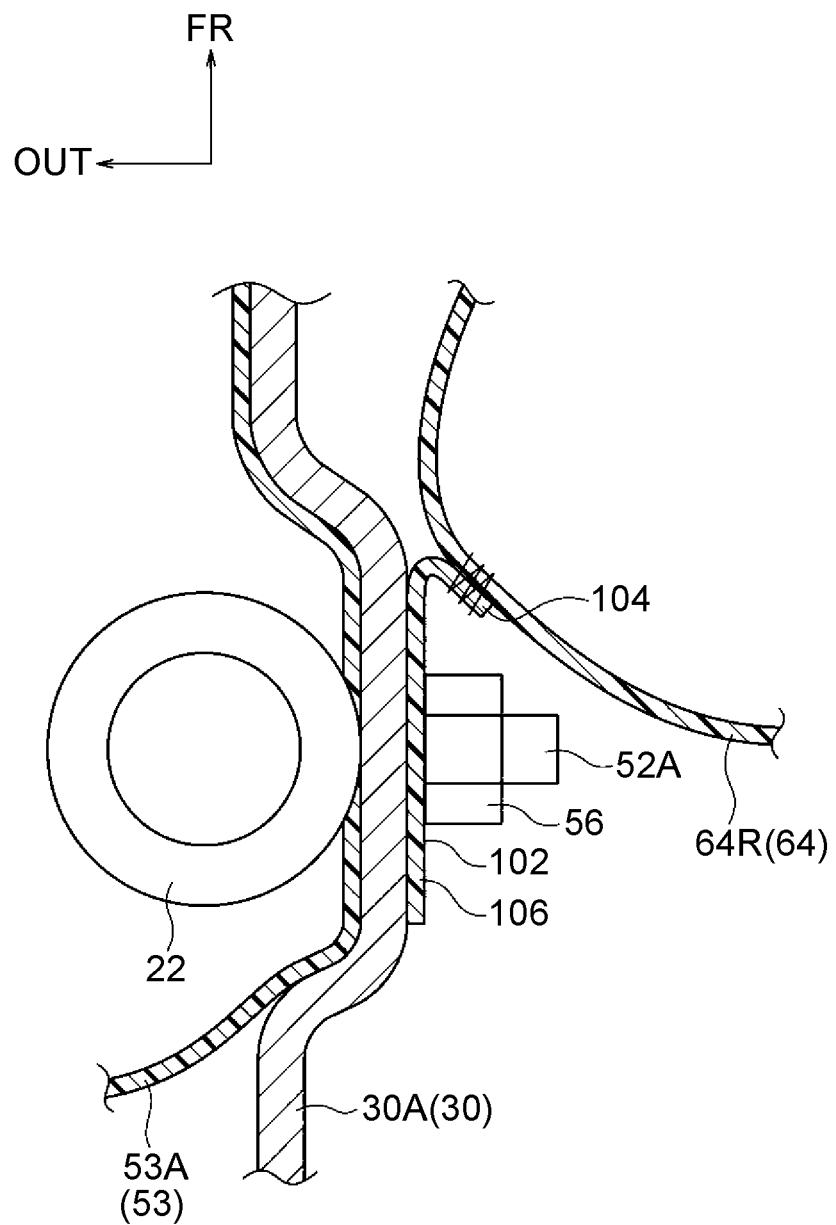
FIG. 6 is an enlarged sectional plan view showing part Z in FIG. 5.

Specifically, as shown in FIG. 6, one end 104 of the strap 102 having a longitudinal direction oriented in the front-rear direction is mounted on the rear part 64R of the inner chamber 64. A through-hole (not shown) is formed at the side of the other end 106 of the strap 102, and the stud bolt 52A extends through this through-hole. By being fastened together when the inflator 22 is fastened, the other end 106 of the strap 102 is fastened and fixed on the inner side of the side wall 30A of the outer side frame 30. Thus, the inner chamber 64 is fastened and fixed on the inner side of the side wall 30A of the outer side frame 30 through the strap 102.

Workings and Effects of Fourth Embodiment

Next, the workings and effects of this embodiment will be described.

This configuration can produce effects similar to those of the first embodiment, since the vehicle seat 98 has the same configuration as the vehicle seat 10 equipped with the side airbag device 14 of the first embodiment, except that the strap 102 is mounted on the inner chamber 64 as described above. The one end 104 of the strap 102 is mounted on the inner chamber 64, and the other end 106 of the strap 102 is mounted on the outer side frame 30. Thus, a positional shift of the inner chamber 64 upon inflation and deployment of the inner chamber 64 can be suppressed by the strap 102. Therefore, the inner chamber 64 can be inflated and deployed with high probability toward the part of the occupant P on the outer side in the vehicle width direction (see FIG. 5).

Fifth Embodiment

Next, a vehicle seat 108 equipped with a side airbag device according to a fifth embodiment of the present disclosure will be described using FIG. 7. Those components that are the same as in the first embodiment will be denoted by the same reference signs and the description thereof will be omitted.

As shown in FIG. 7, the vehicle seat 108 equipped with a side airbag device 110 according to the fifth embodiment has the same basic configuration as the first embodiment, and is characterized in that the diffuser 53 is contained inside the rear chamber 74 of the outer chamber 62.

Specifically, the diffuser 53 is contained inside the rear chamber 74 of the outer chamber 62. More specifically, a rear end 66A of the basic fabric 66 forming the part of the outer chamber 62 on the outer side in the vehicle width direction is sewn on the rear part 53R of the diffuser 53, and thus the diffuser 53 is provided on the rear side inside the rear chamber 74.

Workings and Effects of Fifth Embodiment

Next, the workings and effects of this embodiment will be described.

This configuration can produce effects similar to those of the first embodiment, since the vehicle seat 108 has the same configuration as the vehicle seat 10 equipped with the side airbag device 14 of the first embodiment, except that the diffuser 53 is contained inside the rear chamber 74 of the outer chamber 62. Moreover, with the diffuser 53 being provided inside the rear chamber 74, the volume of the rear chamber 74 can be reduced by the volume of the diffuser 53. Therefore, inflation and deployment of the rear chamber 74 can be completed early.

Modified Examples

In the fifth embodiment, the gas from the inflator 22 inside the diffuser 53 is supplied through the first supply port 55 into the inner chamber 64, and then the gas inside the inner chamber 64 is supplied into the rear chamber 74 through the second supply ports 67. However, the present disclosure is not limited to this example. For example, as shown in FIG. 8, a third supply port 112 that provides communication between the inside of the diffuser 53 and the inside of the rear chamber 74 may be formed in the peripheral wall 53A of the diffuser 53. Thus, inflation and deployment of the rear chamber can be completed early. The opening area of the third supply port 112 may be set to be smaller than the opening area of the first supply port 55. In this case, a large amount of the gas from the inflator 22 inside the diffuser 53 is supplied into the inner chamber 64. Accordingly, the inner chamber 64 is inflated and deployed early, which can improve the performance of initially restraining the occupant P. Moreover, the initial restraining performance can be tuned by adjusting the flow rate of the gas through adjustment of each of the opening area of the first supply port 55 and the opening area of the third supply port 112.

In this embodiment, the diffuser 53 is contained inside the rear chamber 74 of the outer chamber 62, but the present disclosure is not limited to this example. The diffuser 53 may instead be provided inside the inner chamber 64.

In the first to fifth embodiments, the outer chambers 62, 84 and the inner chambers 64, 92 are configured to inflate and deploy toward the vehicle front side by tearing open the seam 46 of the seat skin 28 of the seatback 16. However, the present disclosure is not limited to this configuration. These chambers may be configured to inflate and deploy by tearing open other seam than the seam 46 of the seat skin 28. Moreover, the inner chambers 64, 92 may be configured to inflate and deploy inside the side part 16A of the seatback 16.

The first supply port 55 of the diffuser 53 opens toward the part of the occupant P on the outer side in the vehicle width direction, but the present disclosure is not limited to this example. The first supply port 55 may open in another direction.

The first supply port 55 of the diffuser 53 is located farther on the vehicle front side than the outer side frame 30 when the diffuser 53 has inflated and deployed, but the present disclosure is not limited to this example. The first supply port 55 may be located at another position, for example, at substantially the same position as the front flange 30B of the outer side frame 30 in the seat front-rear direction.

The first supply port 55 of the diffuser 53 is a long hole having the longitudinal direction oriented substantially in the seat up-down direction, but the present disclosure is not limited to this example. The first supply port 55 may instead have a substantially circular shape, and a plurality of first supply ports 55 may be provided.

The outer chamber 84 of the second embodiment and the inner chamber 92 of the third embodiment are provided adjacent to the diffuser 53, but the present disclosure is not limited to this example. The diffuser 53 may be provided inside the outer chamber 84 and the inner chamber 92.

The first supply port 55 of the diffuser 53 opens toward the part of the occupant P on the outer side in the vehicle width direction, but the present disclosure is not limited to this example. As long as the gas flows toward the occupant P, another configuration may be adopted, in which, for example, a flow regulation part is provided.

It should be understood that the present disclosure is not limited to the above embodiments but can also be implemented in other embodiments with various modifications made within the scope of the gist of the disclosure.

What is claimed is:

1. A vehicle seat equipped with a side airbag device comprising:
   an inflator disposed on an outer side in a vehicle width direction relative to a side frame installed inside a side part of a seatback, the side part being located on an outer side in the seatback in the vehicle width direction;
   an inner chamber housed inside the side part and that is configured to inflate and deploy outward of the vehicle seat toward a part of an occupant on the outer side in the vehicle width direction upon receiving supply of a gas from the inflator;
   an outer chamber housed inside the side part, and is configured to inflate and deploy toward the outer side in the vehicle width direction and a vehicle front side relative to the inner chamber upon receiving supply of the gas; and
   a diffuser housed inside the side part and contains the inflator, the diffuser being configured to supply the gas into the inner chamber from a first supply port formed in a peripheral wall of the diffuser when the inflator is activated, wherein
   the diffuser is configured to be located between a rear part of the outer chamber and a rear part of the inner chamber when the outer chamber and the inner chamber are inflated and deployed.

2. The vehicle seat equipped with the side airbag device according to claim 1, wherein
   the inner chamber and the outer chamber are configured to inflate and deploy toward the vehicle front side by tearing open a skin of the seatback, such that a space between the occupant and a side part of a vehicle cabin is filled with the inflated and deployed inner chamber and outer chamber.

3. The vehicle seat equipped with the side airbag device according to claim 1, wherein
   the first supply port opens toward a part of the occupant on the outer side in the vehicle width direction.

4. The vehicle seat equipped with the side airbag device according to claim 3, wherein:
   the diffuser is configured to be foldable; and
   the diffuser and the inner chamber are configured such that, when the diffuser has received supply of the gas from the inflator, the first supply port is located farther on the vehicle front side than the side frame, and the gas supplied into the inner chamber is supplied into the outer chamber through a second supply port of the inner chamber.

5. The vehicle seat equipped with the side airbag device according to claim 4, wherein:
   the outer chamber is divided by a partition into a front chamber located on the vehicle front side and a rear chamber located on a vehicle rear side, the partition having a communication hole; and
   the inner chamber communicates with the rear chamber through the second supply port.

6. The vehicle seat equipped with the side airbag device according to claim 5, wherein
   the diffuser is provided inside the rear chamber.

7. The vehicle seat equipped with the side airbag device according to claim 6, wherein
the diffuser has a third supply port that provides communication between an inside of the diffuser and an inside of the rear chamber in the peripheral wall of the diffuser.

8. The vehicle seat equipped with the side airbag device according to claim 7, wherein
an opening area of the third supply port is smaller than an opening area of the first supply port.

9. The vehicle seat equipped with the side airbag device according to claim 5, wherein
the inner chamber and the rear chamber are configured such that the inner chamber and the rear chamber both in an inflated and deployed state fills a space between the occupant and a side part of a vehicle cabin.

10. The vehicle seat equipped with the side airbag device according to claim 5, wherein:
the outer chamber is configured to restrain a part of an occupant of normal build from a shoulder to a waist as seen from a lateral side of a vehicle when the outer chamber is inflated and deployed, and the inner chamber is configured to restrain a rear part of the occupant of normal build from the shoulder to a chest as seen from the lateral side of the vehicle when the inner chamber is inflated and deployed,
a shoulder restraining portion protruding toward the vehicle front side relative to a portion of the partition in a lower part of the outer chamber is integrally provided in an upper part of the rear chamber; and
the second supply port includes an upper supply port provided on a vehicle upper side in a connection portion between the inner chamber and the rear chamber, and a lower supply port provided on a vehicle lower side relative to the upper supply port and of which an opening area is set to be smaller than an opening area of the upper supply port.

11. The vehicle seat equipped with the side airbag device according to claim 5, wherein
the inner chamber and the rear chamber are formed by a single chamber.

12. The vehicle seat equipped with the side airbag device according to claim 1, wherein
the outer chamber is formed by a single chamber.

13. The vehicle seat equipped with the side airbag device according to claim 1, wherein
one end of a strap is mounted on the inner chamber, and the other end of the strap is mounted on the side frame.

14. The vehicle seat equipped with the side airbag device according to claim 1, wherein
the outer chamber is configured to restrain a part of an occupant of normal build from a shoulder to a waist as seen from a lateral side of a vehicle when the outer chamber is inflated and deployed, and the inner chamber is configured to restrain a rear part of the occupant of normal build from the shoulder to a chest as seen from the lateral side of the vehicle when the inner chamber is inflated and deployed.

15. The vehicle seat equipped with the side airbag device according to claim 1, wherein
the first supply port is an elongated hole having a longitudinal direction oriented substantially in a seat up-down direction.

16. The vehicle seat equipped with the side airbag device according to claim 1, wherein
the inner chamber and the outer chamber are configured to inflate and deploy so that the inner chamber is between an occupant of the vehicle seat and the outer chamber.

17. A side airbag device comprising:
an inflator configured to supply a gas;
a diffuser that contains the inflator;
an inner chamber of which an inside communicates with an inside of the diffuser through a first supply port formed in a peripheral wall of the diffuser; and
an outer chamber of which an inside communicates with the inside of the inner chamber through a second supply port formed in the inner chamber,
wherein the side airbag device is configured so that the outer chamber is outward of the inner chamber in a vehicle width direction when the outer chamber and the inner chamber are inflated,
the inner chamber is configured to deploy outward of a vehicle seat, and
the diffuser is configured to be located between a rear part of the outer chamber and a rear part of the inner chamber when the outer chamber and the inner chamber are inflated and deployed.

18. A vehicle seat equipped with a side airbag device comprising:
an inflator disposed on an outer side in a vehicle width direction relative to a side frame installed inside a side part of a seatback, the side part being located on an outer side in the seatback in the vehicle width direction;
an inner chamber housed inside the side part and that is configured to inflate and deploy outward of the vehicle seat toward a part of an occupant on the outer side in the vehicle width direction upon receiving supply of a gas from the inflator;
an outer chamber housed inside the side part, and is configured to inflate and deploy toward the outer side in the vehicle width direction and a vehicle front side relative to the inner chamber upon receiving supply of the gas; and
a diffuser housed inside the side part and contains the inflator, the diffuser being configured to supply the gas into the inner chamber from a first supply port formed in a peripheral wall of the diffuser when the inflator is activated, wherein
the first supply port opens toward a part of the occupant on the outer side in the vehicle width direction,
the diffuser is configured to be foldable, and
the diffuser and the inner chamber are configured such that, when the diffuser has received supply of the gas from the inflator, the first supply port is located farther on the vehicle front side than the side frame, and the gas supplied into the inner chamber is supplied into the outer chamber through a second supply port of the inner chamber.

19. A vehicle seat equipped with a side airbag device comprising:
an inflator disposed on an outer side in a vehicle width direction relative to a side frame installed inside a side part of a seatback, the side part being located on an outer side in the seatback in the vehicle width direction;
an inner chamber housed inside the side part and that is configured to inflate and deploy outward of the vehicle seat toward a part of an occupant on the outer side in the vehicle width direction upon receiving supply of a gas from the inflator;

an outer chamber housed inside the side part, and is configured to inflate and deploy toward the outer side in the vehicle width direction and a vehicle front side relative to the inner chamber upon receiving supply of the gas;
a diffuser housed inside the side part and contains the inflator, the diffuser being configured to supply the gas into the inner chamber from a first supply port formed in a peripheral wall of the diffuser when the inflator is activated; and
a strap, wherein one end of the strap is mounted on the inner chamber, and the other end of the strap is mounted on the side frame.

\* \* \* \* \*